(12) United States Patent
Strobel et al.

(10) Patent No.: US 12,725,993 B2
(45) Date of Patent: Sep. 1, 2026

(54) ULTRASONIC WELDING METHOD AND ULTRASONIC WELDING PART

(71) Applicant: SCHUNK SONOSYSTEMS GMBH, Wettenberg (DE)

(72) Inventors: Heiko Strobel, Münzenberg (DE); Sebastian Rühl, Wetter (DE); Manuel Fey, Blasbach (DE); Udo Wagenbach, Buseck (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 110 days.

(21) Appl. No.: 18/292,605

(22) PCT Filed: Jul. 29, 2021

(86) PCT No.: PCT/EP2021/071333
§ 371 (c)(1),
(2) Date: Jan. 26, 2024

(87) PCT Pub. No.: WO2023/006210
PCT Pub. Date: Feb. 2, 2023

(65) Prior Publication Data
US 2024/0347992 A1 Oct. 17, 2024

(51) Int. Cl.
*B23K 20/00* (2006.01)
*B23K 20/10* (2006.01)
(Continued)

(52) U.S. Cl.
CPC ....... *H01R 43/0207* (2013.01); *B23K 20/106* (2013.01); *B23K 2101/38* (2018.08)

(58) Field of Classification Search
CPC .. B23K 20/10; B23K 20/106; B23K 2101/32; B23K 2101/38; B23K 2103/18;
(Continued)

(56) References Cited

U.S. PATENT DOCUMENTS 8,118,209 B2 * 2/2012 Ohnuma ............ H01R 43/0207 228/110.1
8,627,996 B2 * 1/2014 Patrikios ................ H01R 4/625 228/180.5
(Continued)

FOREIGN PATENT DOCUMENTS

DE 10 2005 048368 B3 5/2007
DE 112019002641 T5 5/2021
(Continued)

OTHER PUBLICATIONS

WO2015/007619A1 computer English translation (Year: 2015).*
(Continued)

*Primary Examiner* — Erin B Saad
(74) *Attorney, Agent, or Firm* — Maier & Maier, PLLC

(57) ABSTRACT

An ultrasonic welding method includes: arranging the contact element and a first conductor portion of a first conductor between an anvil and a sonotrode; welding the contact element to the first conductor portion, where the anvil and the sonotrode are moved relative to each other in opposite directions to press the first conductor portion and the contact element against each other, and the sonotrode vibrates with ultrasonic vibrations; arranging the contact element and a second conductor portion of a second conductor, which is made of a different electrically conductive material than the first conductor, between the anvil and the sonotrode so that the second conductor portion lies between the first conductor portion and the sonotrode; welding the first to the second conductor portion.

10 Claims, 2 Drawing Sheets

(51) Int. Cl.
*H01R 43/02* (2006.01)
*B23K 101/38* (2006.01)

(58) Field of Classification Search
CPC .... H01R 43/0207; H01R 4/021; H01R 4/625; H01R 4/023; H01R 4/029
See application file for complete search history.

(56) References Cited

U.S. PATENT DOCUMENTS

| | | | | |
|---|---|---|---|---|
| 9,550,252 | B2 * | 1/2017 | Takayashiki | H01R 43/0207 |
| 12,308,588 | B2 * | 5/2025 | Muziol | H01L 24/43 |
| 2002/0000459 | A1 * | 1/2002 | Wnek | B23K 20/10 228/110.1 |
| 2004/0157504 | A1 * | 8/2004 | Fujimoto | H01R 13/03 439/877 |
| 2008/0032569 | A1 | 2/2008 | Steiner et al. | |
| 2008/0265004 | A1 | 10/2008 | Stroh | |
| 2009/0218134 | A1 * | 9/2009 | Stroh | H01R 43/0214 228/110.1 |
| 2010/0170935 | A1 * | 7/2010 | Stroh | B23K 20/10 228/110.1 |
| 2010/0320255 | A1 * | 12/2010 | Sato | B23K 20/106 228/1.1 |
| 2011/0048763 | A1 * | 3/2011 | Schloms | H01R 43/0207 228/110.1 |
| 2011/0198122 | A1 | 8/2011 | Sagawa et al. | |
| 2012/0125976 | A1 * | 5/2012 | Steiner | B23K 20/10 228/110.1 |
| 2016/0136753 | A1 | 5/2016 | Ruhl et al. | |
| 2021/0184376 | A1 | 6/2021 | Kawata et al. | |
| 2021/0399443 | A1 | 12/2021 | Kawata et al. | |

FOREIGN PATENT DOCUMENTS

| | | | |
|---|---|---|---|
| EP | 3474391 | A1 | 4/2019 |
| FR | 2 906 087 | A1 | 3/2008 |
| JP | 2010528867 | A | 8/2010 |
| KR | 1020080072821 | A | 8/2008 |
| WO | 2006010551 | A2 | 2/2006 |
| WO | 2015007619 | A1 | 1/2015 |
| WO | 2020085038 | A1 | 4/2020 |

OTHER PUBLICATIONS

International Search Report issued Apr. 20, 2022, in corresponding International Application No. PCT/EP2021/071333, 6 pages.

* cited by examiner

ULTRASONIC WELDING METHOD AND ULTRASONIC WELDING PART

FIELD

The present invention relates to an ultrasonic welding method for welding an electrically conductive contact element to at least two conductors of different electrically conductive materials. The invention also relates to an ultrasonic welding part which may have been produced by such a method.

BACKGROUND

For various applications, it may be necessary or helpful to weld one or more conductors to a contact element. For example, the contact element may be part of a terminal or a connector.

An electrically conductive contact element may be welded in an ultrasonic welding method to a plurality of one type of conductors of the same electrically conductive material.

DE 10 2005 048368 B3 describes an ultrasonic welding method in which an electrically conductive substrate is successively welded to a plurality of stranded wires. For example, in a first step, a first stranded wire may be welded to the substrate and, in a second step, a second stranded wire may be welded directly to the first stranded wire welded to the substrate. In this case, the substrate is located between the first stranded wire and a sonotrode which generates the required welding energy in the form of ultrasonic vibrations, i.e. the welding energy is introduced into the respective stranded wire via the substrate.

EP 1771274 B1 describes an ultrasonic welding method in which, in contrast to the method in DE 10 2005 048368 B3, a single stranded wire or a compacted or welded stranded wire structure is welded to the substrate, the stranded wire or the stranded wire structure being located between the sonotrode and the substrate, i.e. the welding energy is introduced into the substrate via the stranded wire or stranded wire structure.

EP 3022007 B1 describes an ultrasonic welding method in which a splice of at least two stranded wires of different materials is welded by compacting at least a first stranded wire of a first material, for example copper or a copper alloy, to form a first partial splice and placing at least one second stranded wire of a second material, for example aluminum or an aluminum alloy, on the first partial splice and welding it to the first partial spice to form a whole splice. In this case, the first partial splice is located between the second stranded wire and the sonotrode, i.e. the welding energy is introduced into the second stranded wire via the first partial splice.

SUMMARY

There may be a need for an ultrasonic welding method with which a sufficiently strong, electrically conductive bond may be produced between an electrically conductive contact element and at least two conductors of different electrically conductive materials, for example for weight or cost reasons. In addition, there may be a need for a corresponding ultrasonic welding part.

Such a requirement may be met by the subject matter of the independent claims. Advantageous embodiments are presented in the dependent claims, the following description and the accompanying figures.

A first aspect of the invention relates to an ultrasonic welding method for welding an electrically conductive contact element to at least two conductors of different electrically conductive materials. The ultrasonic welding method comprises at least the following steps which may be performed in the order shown below or in any other order: (i) arranging the contact element and a first conductor portion of a first of the conductors between an anvil and a sonotrode: (ii) welding the first conductor portion to the contact element, the anvil and the sonotrode being moved relative to each other in opposite directions to press the contact element and the first conductor portion against each other, and the sonotrode vibrating with ultrasonic vibrations; (iii) arranging the contact element, which is welded to the first conductor portion, and a second conductor portion of a second one of the conductors, the electrically conductive material of which differs from an electrically conductive material of the first conductor, between the anvil and the sonotrode so that the second conductor portion lies between the sonotrode and the first conductor portion welded to the contact element; and (iv) welding the second conductor portion to the first conductor portion welded to the contact element, the anvil and the sonotrode being moved relative to each other in the opposite directions to press the first conductor portion welded to the contact element and the second conductor portion against each other, and the sonotrode vibrating with ultrasonic vibrations.

"Contact element" may be generally understood to mean a piece of metal that is significantly more rigid than the first and second conductors, for example in the form of a small plate or a disc. The contact element may be flat but may also be bent in one or more places. For example, the contact element may also include an eyelet-shaped or u-shaped portion.

"Conductor", for example, may be understood to mean a single wire, a core, a stranded wire, i.e. a composite of a plurality of individual wires, a solid conductor, such as in the form of a busbar and/or with a rectangular cross-section, or a combination of at least two of the aforementioned examples. Such a conductor, for example, may be surrounded in sections by an electrically insulating outer sheath. "Conductor portion" may be understood to mean an exposed end portion of the respective conductor or an exposed intermediate portion located between two ends of the respective conductor. If the respective conductor is a bundle of a plurality of metal wires or a combination of at least two such bundles, the metal wires in the corresponding conductor portion may be loose or may have been compacted by prior compaction or welding.

For example, the contact element may be placed on an anvil surface of the anvil. The first conductor portion may then be placed on a surface of the contact element directed away from the anvil surface.

To press the respective joining partners against each other and weld them together, the sonotrode may be moved towards the anvil from above, for example, and then moved away from the anvil again in the opposite direction. In this way, it is possible to prevent adhesions of the respective upper joining partner to the sonotrode.

Different welding parameters may be used for welding the first conductor portion than for welding the second conductor portion, as required. At the same time, the welding parameters may be selected depending on the respective material and/or on the respective cross-section of the conductor portions. Among other things, the welding parameters may include, for example, an amplitude of the ultrasonic vibrations, a welding energy, a welding time or a pressure with which the joining partners are to be pressed together (see also below). "Ultrasonic vibrations" may be understood to mean vibrations with frequencies in the ultrasonic range from 16 kHz to 1 GHz, preferably from 16 kHz to 100 kHz.

For example, step (i) of the ultrasonic welding method may comprise: (a) inserting the contact element onto the anvil in an opened welding chamber: (b) closing the welding chamber, the contact element being fixed with the aid of lateral slides: (c) placing the first conductor on the contact element. Step (ii) may then be performed. Step (iii), for example, may comprise: placing the second conductor on the contact element welded to the first conductor. Step (iv) may then be performed.

The individual steps may follow each other immediately or with a certain time interval. For example, it is possible to wait some time after step (ii) before performing step (iii). In principle, step (iii) and step (iv) may also be performed by a different ultrasonic welding device than step (i) and step (ii). Furthermore, after step (iv), the contact element may be welded in a corresponding manner to at least one further first conductor of the same material as the first conductor and/or to at least one further second conductor of the same material as the second conductor. An additional step is also conceivable in which, after step (iv), the contact element is welded in a corresponding manner to a third conductor of a different electrically conductive material than the first and second conductor.

It is possible that prior to step (i), the contact element has been welded in at least one earlier step to a further conductor portion of at least one further conductor of the same electrically conductive material as the first conductor. Accordingly, in step (i), the first conductor portion and the contact element welded to the further conductor portion may be arranged between the anvil and the sonotrode. In step (ii), the further conductor portion welded to the contact element and the first conductor portion may then be welded together. In other words, step (ii) is not necessarily to be understood as the first welding step of the method. Rather, it may also be a second, third or even later welding step of the method.

Until now, the general opinion was that it was only possible to produce welded joints between a contact element and a plurality of conductors that were sufficiently mechanically strong by welding leads of a single type together, i.e. the conductors as well as the contact element should be made of the same material if possible. In the past, therefore, it was not even considered to weld conductors that were not of the same type to contact elements.

At the same time, for weight and cost reduction reasons, there has long been a need to process copper conductors in combination with aluminum conductors, for example as part of producing cable harnesses for present-day motor vehicles.

The ultrasonic welding method described above and below now makes it possible to join a contact element to a plurality of different types of conductors, for example copper and aluminum stranded wires, in an efficient manner without any significant impairment of the mechanical strength compared to existing welding methods. Using the method as described above and below, it was not only possible to overcome a technical prejudice but also to satisfy a need that had existed for some time.

Tensile tests have shown that the ultrasonic welding method described above and below may be used to create a very robust welded joint between a copper plate as the contact element, a copper stranded wire and an aluminum stranded wire. On average, the welded joint produced in this manner withstood a tensile force of around 3000 N which served, by way of example, as a measure of the mechanical strength of the welded joint in these tests. In certain configurations, it was even possible to increase the tensile force to significantly more than 4000 N. Surprisingly, it was found that no aluminum at all adhered to the sonotrode or other welding tools when the aluminum stranded wire was welded, regardless of whether the contact element was first welded to the copper stranded wire and then to the aluminum stranded wire or first to the aluminum stranded wire and then to the copper stranded wire. The ultrasonic welding method thus not only enables good process control and high production accuracy, but also has a very positive effect on the production speed.

The fact that welding takes place in a plurality of successive steps ensures that the cross-sections of the conductors welded to each other or to the contact element are clearly differentiated from each other. For example, the cross-sections may each have a rectangle-like contour without individual metal wires of the one conductor lying in the cross-section of the respective other conductor. In this manner, it is possible to prevent undesirable variations in strength, pressing and welding dimension, and welding time.

A variant in which the contact element is first welded to the copper stranded wire and then to the aluminum stranded wire proved to be particularly favorable. At the same time, particularly high mechanical strength was established in the welded joint between the contact element and the two stranded wires. Also, no damage to the stranded wires was observed, such as severed metal wires or excessive burrs. This was probably due to the fact that, by welding on the copper stranded wire with correspondingly high welding parameters, it was possible to create a sufficiently compacted base for the next welding operation. Such a welded joint may thus have good welding properties similar to a compact component produced in one piece.

The reverse variant, in which the contact element is first welded to the aluminum stranded wire and then to the copper stranded wire, produced similarly good results, the only difference being that overall lower mechanical strengths were achieved.

If the materials of the conductors differ significantly in their strength, it may be advantageous if the contact element is first welded to the conductor made of the harder material and then to the conductor made of the softer material.

The ultrasonic welding method described above and below may be performed by an ultrasonic welding device specifically developed for its execution. For example, such an ultrasonic welding device may comprise an anvil with an anvil surface for receiving the contact element, a sonotrode capable of vibrating with ultrasonic vibrations, a first lateral stop, and a second lateral stop, it being possible to mount at least one of these components movably along at least one spatial axis.

The anvil, the sonotrode, the first lateral stop and the second lateral stop, for example, may, in a welding position, form a cavity which is bounded by the anvil and the sonotrode in the direction of the first spatial axis and by the first lateral stop and the second lateral stop in the direction of the second spatial axis. The anvil surface may be partially covered by the first lateral stop in the welding position and a portion of the first lateral stop, which partially covers the anvil surface in the welding position, may be separated from the anvil surface by a first gap for receiving a first edge portion of the contact element. In addition or alternatively, the anvil surface may be partially covered by the second lateral stop in the welding position and a portion of the second lateral stop, which partially covers the anvil surface in the welding position, may be separated from the anvil surface by a second gap for receiving a second edge portion of the contact element. For example, the first and the second gap may be opposite each other to receive opposing edge portions of the contact element.

With the aid of such an ultrasonic welding device, contact elements of different shapes, sizes and/or materials may be processed efficiently in the ultrasonic welding method described above and below. For example, it may be used to prevent adhesions of the conductors in the relevant edge portion of the contact element.

Features of the ultrasonic welding device may also be features of the ultrasonic welding method described above and below and vice versa.

For example, the anvil and the sonotrode may therefore be moved relative to each other by moving the sonotrode towards the stationary anvil. However, the reverse is also possible or an embodiment in which both the anvil and the sonotrode are moved.

For example, the anvil and the first lateral stop may be movable relative to each other and/or the anvil and the second lateral stop may be movable relative to each other additionally along the first spatial axis in order to adjust the width of the first or second gap, respectively. This makes it possible to reduce the width of the first or second gap such that the edge portion of the contact element located therein is clamped firmly between the anvil and the respective lateral stop. This eliminates the need for additional clamping means for fixing the contact element. In addition, this makes it possible to prevent individual metal wires from being pushed into the first or second gap during welding which could result in them being damaged.

Expediently, the anvil and the first lateral stop or the anvil and the second lateral stop may be adjustable along the first spatial axis independently of a movement of the sonotrode relative to the anvil. Moreover, the first and the second lateral stop may be adjustable along the first spatial direction independently of each other. This allows the two gaps to be adapted in their respective width to edge portions of the contact element with different heights.

Moreover, it is possible that the sonotrode is arranged above the anvil in the welding position. In other words, in welding mode, viewed in the direction of the first, vertical spatial axis, the sonotrode may be located at the top and the anvil at the bottom. This helps to prevent material from adhering to the sonotrode.

A second aspect of the invention relates to an ultrasonic welding part which may have been produced by the ultrasonic welding method described above and below or by a different welding method. The ultrasonic welding part comprises an electrically conductive contact element, a first conductor and a second conductor, the electrically conductive material of which differs from an electrically conductive material of the first conductor. In this case, a first conductor portion of the first conductor is ultrasonically welded to the contact element and a second conductor portion of the second conductor is ultrasonically welded to the first conductor portion.

Such an ultrasonic welding part also withstands relatively high mechanical loads. In addition, it may be efficiently mass produced.

Features of the ultrasonic welding part may also be features of the ultrasonic welding method described above and below and/or of the ultrasonic welding device described above and below and vice versa.

Without restricting the scope of the invention in any way, ideas and possible features relating to embodiments of the invention may be considered to be based, inter alia, on the thoughts and findings described below.

According to one embodiment, the first conductor portion may be arranged between the contact element and the sonotrode. In this way, the ultrasonic vibrations may be transmitted directly by the sonotrode to the first conductor portion. Alternatively, it is possible for the contact element to be arranged between the first conductor portion and the sonotrode.

According to one embodiment, the first conductor portion may be welded under a higher specific energy input than the second conductor portion. A specific energy input may be understood to mean an input of a specific energy, i.e. related to a cross-sectional area of the respective conductor portion, which is to be introduced into the respective conductor portion in order to achieve a proper welding result. In other words, welding parameters may be selected for welding the first conductor portion which have a higher energy input per unit area than for welding the second conductor portion. In this way, the mechanical strength of the welded joint may be increased. For example, the first conductor portion may be welded with a specific energy input that is higher by at least 5%, preferably by at least 10% or at least 20%, compared to the second conductor portion.

For example, the materials of the first conductor portion and the contact element may be selected such that, advantageously, a relatively high specific energy input is required to weld them together. This may apply, for example, if the first conductor portion and the contact element are made of copper or a copper alloy. After these two joining partners have been welded together, a further joining partner in the form of the second conductor portion may be added and welded in a subsequent method step. In this case, the material of the second conductor portion may be selected such that, advantageously, a lower specific energy input is required to weld the second conductor portion to the first conductor portion than was the case when the contact element was welded to the first conductor portion. In particular, the second conductor portion may consist of a material that has a lower strength and/or a lower melting point compared to the material of the first conductor portion. For example, the second conductor portion may consist of aluminum or an aluminum alloy.

If all joining partners were welded together in a common welding operation, compromises would have to be made with regard to the welding parameters to be used in the process, since different pairings of joining partners generally require different welding parameters to achieve optimum welding results in each case. However, due to the fact that the contact element, the first conductor portion and the second conductor portion are welded together in separate successive welding operations, i.e. in a cascade, means that optimized welding parameters, which are optimally adapted to the respective pairing of joining partners, may be used for each welding operation.

In particular, care may be taken to ensure that a higher input of welding energy takes place during the first welding operation than during the second welding operation, so that the joining partners of the first welding operation receive sufficiently high welding energy for welding them. During the second welding operation, a lower input of welding energy, which is sufficient for welding the joining partners there, may be applied. In this way, the second, for example more sensitive, joining partner of the second welding operation may be protected from impairment or even damage which would possibly occur if the second joining partner received the same welding energy as the joining partners of the first welding operation.

According to one embodiment, the value of at least one of the following welding parameters may be selected to be greater when welding the first conductor portion than when welding the second conductor portion: an amplitude of the ultrasonic vibrations: a pressure which is to be applied to the respective conductor portion, i.e. a pressure with which the respective conductor portion is to be pressed against the respective joining partner; a welding energy which is to be introduced into the respective joining partners as a maximum; a height difference between a height of the respective joining partners measured before welding in the compacted state and a height of the respective joining partners measured after welding in the welded state. In this way, the energy input for the respective welding operation may be controlled very precisely.

Welding may be carried out in each case by so-called energy welding with the input of a predetermined welding energy, by so-called height welding, also known as welding at absolute height or absolute-h welding, and/or by so-called delta-h welding.

In height welding, welding is carried out until a specified height of the weld metal is reached, "weld metal" here meaning the contact element and the first conductor portion, or the contact element welded to the first conductor portion and the second conductor portion. In contrast to energy welding, welding does not end after inputting a predetermined energy, but after the predetermined height of the overall weld metal has been reached. This absolute height may expediently be selected lower for welding the first conductor portion than for welding the second conductor portion.

In delta-h welding, welding is carried out until a specified difference between the so-called compacting dimension and the so-called welding dimension is reached. The compacting dimension is the dimension of the weld metal before welding and is measured by moving the tools onto the weld metal to compact it, and measuring the height of the compacted weld metal. The welding dimension is the dimension of the weld metal after welding and is measured after welding. The welding dimension is generally smaller than the compacting dimension since the height of the weld metal decreases during welding.

In height and delta-h welding, the welding energy is therefore not a set value (as in energy welding), but a resulting value.

According to one embodiment, the first conductor portion and/or the second conductor portion are each arranged in a welding chamber and welded together, which welding chamber is defined in the direction of a first spatial axis by the sonotrode and a welding portion of the contact element and in the direction of a second spatial axis by a first lateral stop and a second lateral stop. In this case, the welding portion and the first conductor portion may be welded together.

The first and the second spatial axes may be axes which are orthogonal to each other. For example, the first spatial axis may be a vertical axis and the second spatial axis may be a horizontal axis or vice versa.

The welding chamber may be adjustable in size and/or position, i.e. it may be enlarged, reduced, opened or closed, by moving the anvil, the sonotrode, the first lateral stop and/or the second lateral stop along the first and/or second spatial axis.

"Lateral stop", for example, may be understood to mean a lateral slide or a surface plate.

According to one embodiment, the welding chamber may have a smaller width in the direction of the second spatial axis than the contact element. In other words, an extension of the welding portion or a distance of the first lateral stop from the second lateral stop, by which a welding width is specified, may be smaller in the direction of the second spatial axis than a maximum extension of the contact element in this direction. Alternatively, the welding chamber may substantially coincide in its width with a width of the contact element.

For example, this may be achieved by arranging a first edge portion of the contact element abutting the welding portion outside the welding chamber in a first gap between the anvil and the first lateral stop, and/or by arranging a second edge portion of the contact element abutting the welding portion outside the welding chamber in a second gap between the anvil and the second lateral stop. In other words, certain edge portions of the contact element may be covered by appropriately adjusting the first and/or second lateral stop. In this way, it is possible to effectively prevent the first or second conductor portion from being welded to the respective edge portion.

The welding portion may be located between the first and the second edge portion, viewed in the direction of the second spatial axis, and the first and the second edge portions may merge directly into the welding portion.

According to one embodiment, to form the welding chamber, the first lateral stop may be moved so far along the second spatial axis until it strikes against a first side of the contact element. Additionally or alternatively, the second lateral stop may be moved so far along the second spatial axis until it strikes against a second side of the contact element. In other words, the width of the welding chamber may be adjusted so that it substantially coincides with the width of the contact element.

According to one embodiment, the first edge portion may be fixed between the anvil and the first lateral stop by moving the anvil and the first lateral stop relative to each other in opposite directions. Additionally or alternatively to the first edge portion, the second edge portion may be fixed between the anvil and the second lateral stop by moving the anvil and the second lateral stop relative to each other in opposite directions. This eliminates the need for additional clamping means for fixing the contact element. In addition, this makes it possible to prevent individual metal wires from being pushed into the first or second gap during welding which could result in them being damaged.

According to one embodiment, the first conductor portion and the second conductor portion may be arranged and welded such that the first conductor welded to the contact element extends from the contact element in a different direction than the second conductor welded to the contact element. In other words, the first conductor portion and the second conductor portion may be aligned with respect to each other such that their respective longitudinal axes clearly and visibly differ from each other and, as a result, the conductors, more accurately the non-welded conductor portions of the conductors adjacent to the respective welded conductor portions, also extend from the contact element in different directions, for example in mutually opposing, mutually perpendicular or mutually oblique directions. In other words, it is possible for the respective longitudinal axes of the conductors to lie substantially on an (imaginary)

common straight line or to intersect. Alternatively, the two conductors may also extend from the contact element in the same direction.

According to one embodiment, the ultrasonic welding method may further comprise the following steps which may be carried out in the order indicated below, for example subsequent to the step (iv) described above, or in a different order: (v) arranging a third conductor portion of at least a third conductor and the contact element welded to the first conductor portion and to the second conductor portion between the anvil and the sonotrode so that the third conductor portion lies between the sonotrode and the second conductor portion welded to the first conductor portion: (vi) welding the third conductor portion to the second conductor portion welded to the first conductor portion, the anvil and the sonotrode being moved relative to each other in the opposite directions to press the third conductor portion and the second conductor portion welded to the first conductor portion against each other, and the sonotrode vibrating with ultrasonic vibrations.

In this case, the third conductor may be made of the same electrically conductive material as the first and/or the second conductor and/or as the contact element. It is also possible that the third conductor is made of a different electrically conductive material than the first and/or second conductor and/or than the contact element. Thus the contact element may be efficiently joined to three or more than three conductors made of two or more different electrically conductive materials to form a stable electrically conductive ultrasonic welding part.

According to one embodiment, the contact element may be formed at least partially of the electrically conductive material of the first conductor. This allows a sufficiently compact, homogeneous base part to be provided for the subsequent welding operation. Additionally or alternatively, the contact element may be formed at least partially of the electrically conductive material of the second conductor.

The contact element may be formed at least partially of a different electrically conductive material than the conductors. Additionally, the contact element may be at least partially coated, for example with a coating of silver, a silver alloy, nickel or a nickel alloy.

According to one embodiment, the electrically conductive material of the first conductor may be copper or a copper alloy. Additionally or alternatively, the electrically conductive material of the second conductor may be aluminum or an aluminum alloy. Using a copper stranded wire makes it possible to guarantee very good electrical conductivity of the completed weld joint. If the copper stranded wire is combined with an aluminum stranded wire instead of a further copper stranded wire as the second conductor, the weight of the completed weld joint may also be significantly reduced.

According to an alternative embodiment, the electrically conductive material of the first conductor may be aluminum or an aluminum alloy. Additionally or alternatively, the electrically conductive material of the second conductor may be copper or a copper alloy.

According to one embodiment, the ultrasonic welding part may further comprise at least one third conductor. In this case, a third conductor portion of the third conductor may be welded to the second conductor portion by ultrasonic welding, for example in corresponding additional steps of the ultrasonic welding method described above and below. Such an ultrasonic welding part also withstands relatively high mechanical loads. In addition, it may be efficiently mass produced.

It should be noted that possible features and advantages of embodiments of the invention are described above and below partly with reference to an ultrasonic welding method, partly with reference to an ultrasonic welding device for carrying out this method. A person skilled in the art will recognize that the features described for individual embodiments may be transferred to other embodiments in an analogous and suitable manner, may be adapted and/or interchanged to arrive at further embodiments of the invention and possibly synergistic effects.

BRIEF DESCRIPTION OF THE DRAWINGS

Advantageous embodiments of the invention are further explained below with reference to the accompanying drawings, and neither the drawings nor the explanations are to be construed as restricting the invention in any way.

The figures are merely schematic and not true to scale. Identical reference numerals in the various drawings denote identical features or features having the same effect.

DETAILED DESCRIPTION

Figure 1:
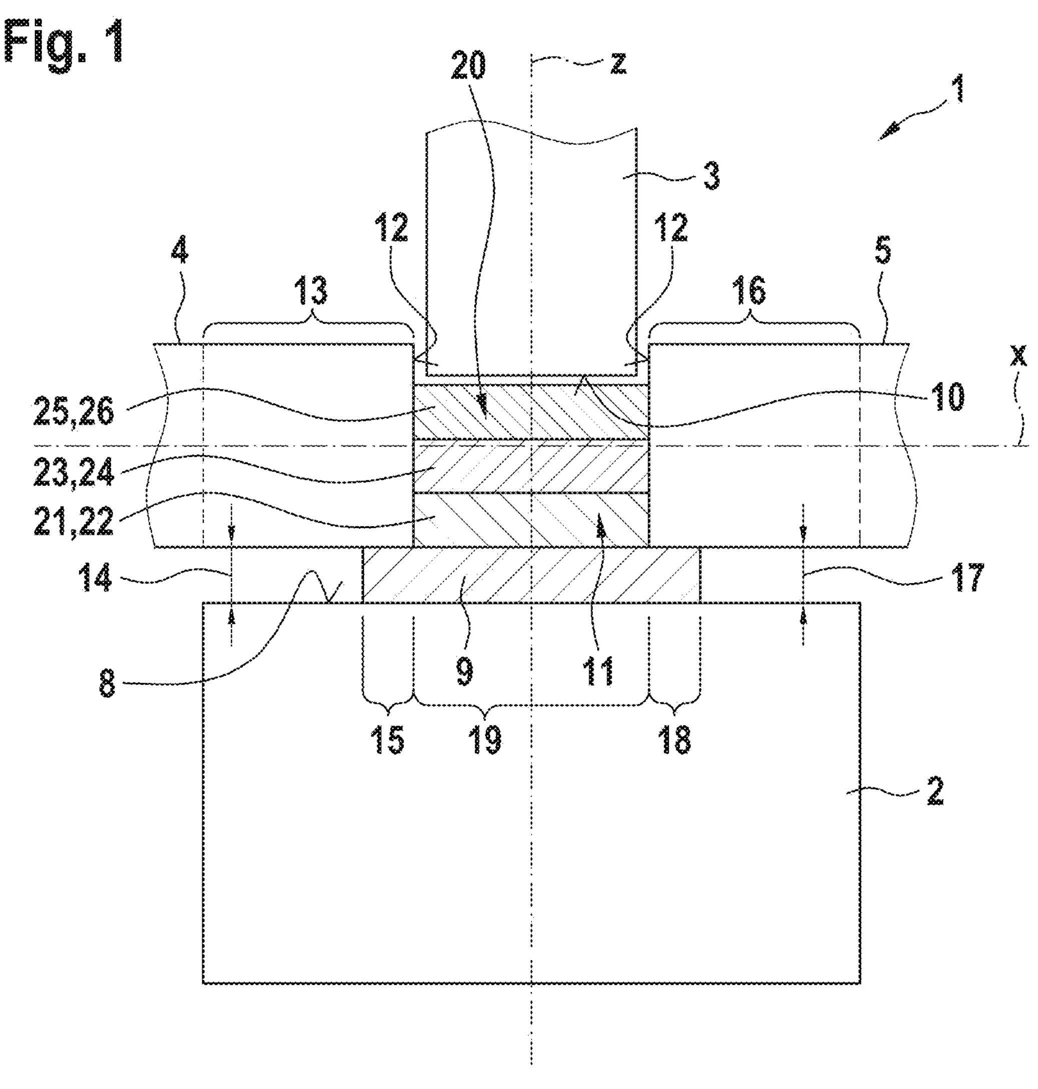
FIG. 1 shows an ultrasonic welding device for carrying out an ultrasonic welding method according to an embodiment of the present invention.

FIG. 1 shows an ultrasonic welding device 1 which comprises an anvil 2, a sonotrode 3 capable of vibrating with ultrasonic vibrations, a first lateral stop 4, and a second lateral stop 5. The anvil 2 and the sonotrode 3 are movable relative to each other along a first spatial axis z, in this case a vertical axis. The first lateral stop 4 and the second lateral stop 5 are movable relative to each other along a second spatial axis x, in this case a horizontal axis. In this example, the anvil 2 is below the sonotrode 3. The anvil 2 has an anvil surface 8 on which a contact element 9 is placed, for example in the form of a small copper or aluminum plate. The sonotrode 3 has a sonotrode surface 10 opposite the anvil surface 8 for coupling the ultrasonic vibrations into the respective joining partners.

In FIG. 1, the anvil 2, the sonotrode 3, the first lateral stop 4, and the second lateral stop 5 are located in a welding position in which they form a cavity 11 which is bounded in the direction of the first spatial axis z by the anvil surface 8 and the sonotrode surface 10 and in the direction of the second spatial axis x by two opposing end faces 12 of the lateral stops 4, 5.

In this case, a left-hand portion of the anvil surface 8 is covered by a first end portion 13 of the first lateral stop 4, the first end portion 13 in the direction of the first spatial axis z being separated from the anvil surface 8 by a first gap 14. A first edge portion 15 of the contact element 9 may be clamped in this first gap 14.

Additionally, in this example, a right-hand portion of the anvil surface 8 is covered by a second end portion 16 of the second lateral stop 5, this second end portion 16 in the direction of the first spatial axis z being separated from the anvil surface 8 by a second gap 17. A second edge portion 18 of the contact element 9 may be clamped in this second gap 17.

For fixing the contact element 9, the two lateral stops 4, 5 may additionally be movable in the direction of the first spatial axis z relative to the anvil surface 8.

Extending between the two edge portions 15, 18 is a welding portion 19 of the contact element 9 which, together with the sonotrode surface 10 opposing it and the two end faces 12, bounds a welding chamber 20. In this welding chamber 20, a first conductor portion 21 of a first conductor 22 and a second conductor portion 23 of a second conductor 24 are arranged one above the other in the direction of the first spatial axis z, the first conductor portion 21 being welded to the welding portion 19 and the second conductor portion 23 being welded to the first conductor portion 21. In this example, the welding chamber 20 has a significantly smaller width in the direction of the second spatial axis x than the contact element 9.

The first conductor portion 21 and the second conductor portion 23 differ in their electrically conductive materials. In this example, the first conductor portion 21 is made of copper or a copper alloy and the second conductor portion 23 is made of aluminum or an aluminum alloy. The reverse case is also possible or any other combination of different electrically conductive materials.

The contact element 9 is also formed of copper or a copper alloy in this example. Alternatively, the contact element 9 may be formed of aluminum or an aluminum alloy or another suitable metal or another suitable metal alloy.

Additionally, in this example, a third conductor portion 25 of a third conductor 26 is arranged in the welding chamber 20, the third conductor portion 25 being welded to the second conductor portion 23. The third conductor portion 25 may also be made of copper or a copper alloy: however, it may also be made of aluminum or an aluminum alloy or any other metal or any other metal alloy.

Figure 2:
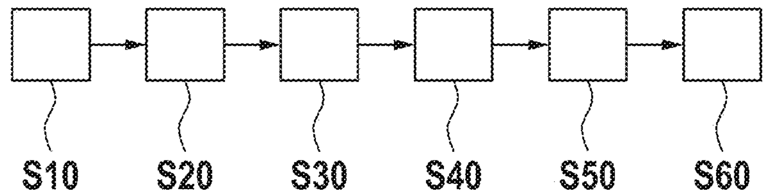
FIG. 2 shows a flowchart illustrating an ultrasonic welding method according to an embodiment of the present invention.

An exemplary sequence of an ultrasonic welding method in which the three conductor portions 21, 23, 25 may be welded together or to the contact element 9 in the welding chamber 20 is described in greater detail below. A corresponding flowchart is shown in FIG. 2.

In step S10, the contact element 9 and the first conductor portion 21 of the first conductor 22 are arranged between the anvil 2 and the sonotrode 3, for example in the cavity 11, such that the first conductor portion 21 lies between the contact element 9 and the sonotrode 3.

In step S20, the first conductor portion 21 is welded to the contact element 9, for example in the welding chamber 20, the anvil 2 and the sonotrode 3 being moved relative to each other in opposite directions to press the first conductor portion 21 against the contact element 9, and the sonotrode 3 vibrating with ultrasonic vibrations.

In step S30, the contact element 9 welded to the first conductor portion 21 and the second conductor portion 23 of the second conductor 24, the electrically conductive material of which differs from the electrically conductive material of the first conductor 22, are arranged between the anvil 2 and the sonotrode 3, for example in the cavity 11, such that the second conductor portion 23 lies between the first conductor portion 21 welded to the contact element 9 and the sonotrode 3.

In step S40, the second conductor portion 23 and the first conductor portion 21 welded to the contact element 9 are welded together, for example in the welding chamber 20, the anvil 2 and the sonotrode 3 being moved relative to each other in opposite directions to press the second conductor portion 23 against the first conductor portion 21 welded to the contact element 9, and the sonotrode 3 vibrating with ultrasonic vibrations.

In an optional step S50, the contact element 9 welded to the first conductor portion 21 and to the second conductor portion 23 and the third conductor portion 25 of the third conductor 26 are arranged between the anvil 2 and the sonotrode 3, for example in the cavity 11, such that the third conductor portion 25 lies between the second conductor portion 23 welded to the first conductor portion 21 and the sonotrode 3.

Finally, in an optional step S60, the third conductor portion 25 and the second conductor portion 23 welded to the first conductor portion 21 are welded together, for example in the welding chamber 20, the anvil 2 and the sonotrode 3 being moved relative to each other in opposite directions to press the third conductor portion 25 against the second conductor portion 23 welded to the first conductor portion 21, and the sonotrode 3 vibrating with ultrasonic vibrations.

Figure 3:
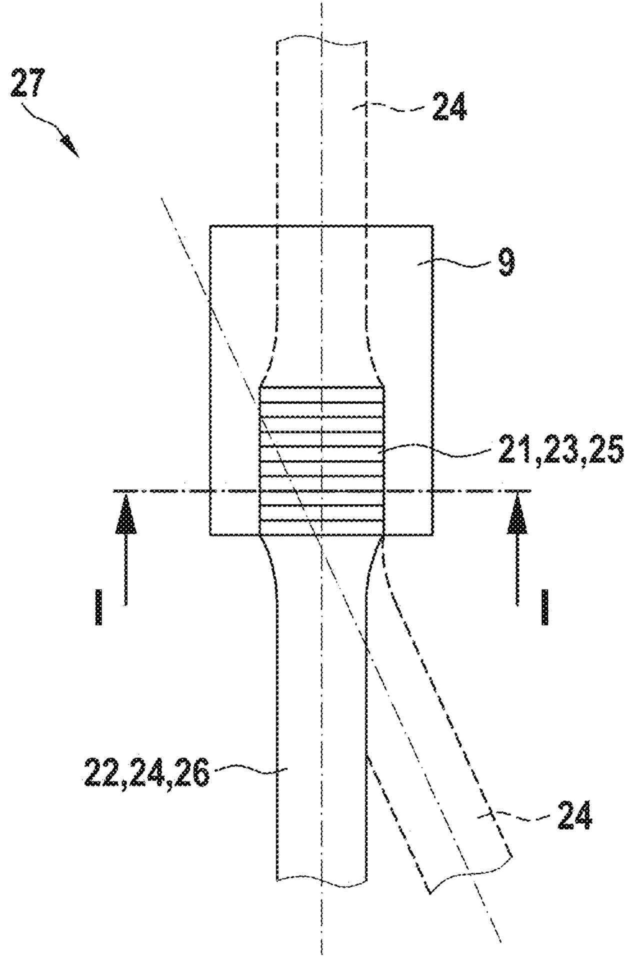
FIG. 3 shows an ultrasonic welding part according to an embodiment of the present invention in a view from above.

FIG. 3 shows an ultrasonic welding part 27, which in this example has been produced by means of the ultrasonic welding device 1 in the ultrasonic welding method described above and thus corresponds to the fully welded contact element 9 of FIG. 1. However, the ultrasonic welding part 27 may also have been produced in a different manner than described with reference to FIG. 1 and FIG. 2.

It may be gathered from the top view of the ultrasonic welding part 27 shown in FIG. 3 that the conductors 22, 24 may each extend from the contact element 9 in the same direction or, as marked with dashed lines, in different, in particular opposite, directions. Two intersecting dashed and dotted lines mark possible longitudinal axes of the conductors 22, 24 by way of example. Moreover, a section line I-I is drawn which marks the course of the section through the contact element 9 and the three conductor portions 21, 23, 25 shown in FIG. 1.

In conclusion, it should be noted that terms such as "having", "comprising", etc. do not exclude other elements or steps, and terms such as "one" or "a" do not exclude a plurality. It should further be noted that features or steps which have been described with reference to one of the embodiments described above may also be used in combination with other features or steps of other of the embodiments described above. Reference numerals in the claims are not to be regarded as a restriction.

LIST OF REFERENCE NUMERALS

- 1 Ultrasonic welding device
- 2 Anvil
- 3 Sonotrode
- 4 First lateral stop
- 5 Second lateral stop
- 8 Anvil surface
- 9 Contact element
- 10 Sonotrode surface
- 11 Cavity
- 12 End face
- 13 First end portion/portion of the first lateral stop partially covering the anvil surface in the welding position
- 14 First gap
- 15 First edge portion
- 16 Second end portion/portion of the second lateral stop partially covering the anvil surface in the welding position
- 17 Second gap
- 18 Second edge portion
- 19 Welding portion
- 20 Welding chamber

21 First conductor portion
22 First conductor
23 Second conductor portion
24 Second conductor
25 Third conductor portion
26 Third conductor
27 Ultrasonic welding part
x Second spatial axis
Z First spatial axis

The invention claimed is:

1. An ultrasonic welding method for welding an electrically conductive contact element to at least two conductors of different electrically conductive materials, wherein the ultrasonic welding method comprises:

arranging the contact element and a first conductor portion of a first one of the conductors between an anvil and a sonotrode;

welding the first conductor portion to the contact element, wherein the anvil and the sonotrode are moved relative to each other in opposite directions to press the contact element and the first conductor portion against each other, and wherein the sonotrode vibrates with ultrasonic vibrations;

arranging the contact element, which is welded to the first conductor portion, and a second conductor portion of a second one of the conductors, the electrically conductive material of which differs from an electrically conductive material of the first conductor, between the anvil and the sonotrode so that the second conductor portion lies between the sonotrode and the first conductor portion welded to the contact element; and welding the second conductor portion to the first conductor portion welded to the contact element, wherein the anvil and the sonotrode are moved relative to each other in the opposite directions to press the first conductor portion welded to the contact element and the second conductor portion against each other, and wherein the sonotrode vibrates with ultrasonic vibrations.

2. The ultrasonic welding method according to claim 1, wherein the first conductor portion is arranged between the contact element and the sonotrode.

3. The ultrasonic welding method according to claim 1, wherein the first conductor portion is welded under a higher specific energy input than the second conductor portion.

4. The ultrasonic welding method according to claim 1, wherein at least one of the following welding parameters is selected to be greater in value when welding the first conductor portion than when welding the second conductor portion:

an amplitude of the ultrasonic vibrations;

a pressure to be applied to the respective conductor portion;

a welding energy;

a height difference between a height of the respective joining partners measured before welding and a height of the respective joining partners measured after welding.

5. The ultrasonic welding method according to claim 1, wherein the first conductor portion and the second conductor portion are each arranged in a welding chamber and welded together, which welding chamber is defined in a direction of a first spatial axis by the sonotrode and a welding portion of the contact element and in a direction of a second spatial axis by a first lateral stop and a second lateral stop, wherein the welding portion and the first conductor portion are welded together.

6. The ultrasonic welding method according to claim 5, wherein the welding chamber has a smaller width in the direction of the second spatial axis than the contact element; and/or wherein a first edge portion of the contact element adjacent to the welding portion is arranged outside the welding chamber in a first gap between the anvil and the first lateral stop;

and/or wherein a second edge portion of the contact element adjacent to the welding portion is arranged outside the welding chamber in a second gap between the anvil and the second lateral stop.

7. The ultrasonic welding method according to claim 6, wherein the first edge portion is fixed between the anvil and the first lateral stop by moving the anvil and the first lateral stop relative to each other in opposite directions along the first spatial axis; and/or wherein the second edge portion is fixed between the anvil and the second lateral stop by moving the anvil and the second lateral stop relative to each other in opposite directions along the first spatial axis.

8. The ultrasonic welding method according to claim 5, wherein, to form the welding chamber, the first lateral stop is moved so far along the second spatial axis until it strikes against a first side of the contact element, and/or the second lateral stop is moved so far along the second spatial axis until it strikes against a second side of the contact element.

9. The ultrasonic welding method according to claim 1, wherein the first conductor portion and the second conductor portion are arranged and welded such that the first conductor welded to the contact element extends from the contact element in a different direction than the second conductor welded to the contact element.

10. The ultrasonic welding method according to claim 1, further comprising:

arranging the contact element, which is welded to the first conductor portion and the second conductor portion, and a third conductor portion of at least a third conductor between the anvil and the sonotrode, such that the third conductor portion lies between the second conductor portion welded to the first conductor portion and the sonotrode;

welding the third conductor portion to the second conductor portion welded to the first conductor portion, wherein the anvil and the sonotrode are moved relative to each other in the opposite directions to press the third conductor portion and the second conductor portion welded to the first conductor portion against each other, and wherein the sonotrode vibrates with ultrasonic vibrations.

* * * * *